(12) United States Patent
Thunnissen et al.

(10) Patent No.: US 7,134,717 B2
(45) Date of Patent: Nov. 14, 2006

(54) BACKREST FOR A VEHICLE SEAT

(75) Inventors: Jan Thunnissen, Wanssum (NL); Bernd Kraemer, Zingsheim (DE); Silvio Hartlaub, Cologne (DE)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 10/489,060

(22) PCT Filed: Sep. 6, 2002

(86) PCT No.: PCT/EP02/09965

§ 371 (c)(1),
(2), (4) Date: Mar. 9, 2004

(87) PCT Pub. No.: WO03/022624

PCT Pub. Date: Mar. 20, 2003

(65) Prior Publication Data

US 2004/0239160 A1    Dec. 2, 2004

(30) Foreign Application Priority Data

Sep. 10, 2001 (DE) ............................ 201 14 944 U
Oct. 18, 2001 (DE) ................................ 101 50 899

(51) Int. Cl.
*B60N 2/42* (2006.01)
(52) U.S. Cl. .............................. 297/216.12; 297/216.13
(58) Field of Classification Search ........... 297/216.12, 297/216.13, 216.14
See application file for complete search history.

(56) References Cited

U.S. PATENT DOCUMENTS

| | | | | |
|---|---|---|---|---|
| 4,822,102 A * | 4/1989 | Duvenkamp | ................ | 297/403 |
| 5,110,182 A * | 5/1992 | Beauvais | ................ | 297/216.11 |
| 5,366,269 A * | 11/1994 | Beauvais | ................ | 297/216.19 |
| 5,927,804 A * | 7/1999 | Cuevas | ................... | 297/216.12 |
| 6,022,074 A * | 2/2000 | Swedenklef | ........... | 297/216.14 |
| 6,024,406 A * | 2/2000 | Charras et al. | ........ | 297/216.14 |
| 6,053,571 A * | 4/2000 | Faigle | ................... | 297/216.13 |
| 6,149,232 A * | 11/2000 | Meyer | ................... | 297/216.12 |
| 6,179,379 B1 * | 1/2001 | Andersson | ............. | 297/216.13 |
| 6,273,511 B1 * | 8/2001 | Wieclawski | .............. | 297/463.1 |
| 6,352,285 B1 * | 3/2002 | Schulte et al. | .............. | 280/756 |
| 6,655,733 B1 * | 12/2003 | Humer et al. | .......... | 297/216.12 |

FOREIGN PATENT DOCUMENTS

| | | |
|---|---|---|
| DE | 29603991 U1 | 3/1996 |
| DE | 19750375 A1 | 11/1997 |
| DE | 19738201 A1 | 4/1998 |

(Continued)

*Primary Examiner*—Milton Nelson, Jr.
*Assistant Examiner*—Stephen D'Adamo
(74) *Attorney, Agent, or Firm*—Foley & Lardner LLP

(57) ABSTRACT

The backrest of a vehicle seat having a headrest, which may be displaced from an in-use position to a safety position by the effect of a force generation device, and which is fixed, by means of retaining elements extending into the backrest. The retaining elements may be displaced relative to the backrest, under the effect of the force generating device, by means of at least one connector guide, from a connector into a connector side block. The connector slide block is preferably lockable in the connector on the displacement from the in-use position to the safety position. One embodiment includes a rectangular connector slide block which performs a turning movement on the displacement, as a result of which the radial extent of the above relative to the connector is increased thus locking the connector slide block in the connector with a positive or non-positive fit.

22 Claims, 5 Drawing Sheets

FOREIGN PATENT DOCUMENTS

| | | |
|---|---|---|
| DE | 19817980 A1 | 4/1998 |
| DE | 19924236 C1 | 5/1999 |
| DE | 19938904 A1 | 8/1999 |
| DE | 10054793 A1 | 11/2000 |
| DE | 20114944 U1 | 9/2001 |
| DE | 10150899 A1 | 3/2003 |
| EP | 0888926 A1 | 6/1998 |
| EP | 0982186 A2 | 7/1999 |
| WO | WO 03/022624 A1 | 3/2003 |

* cited by examiner

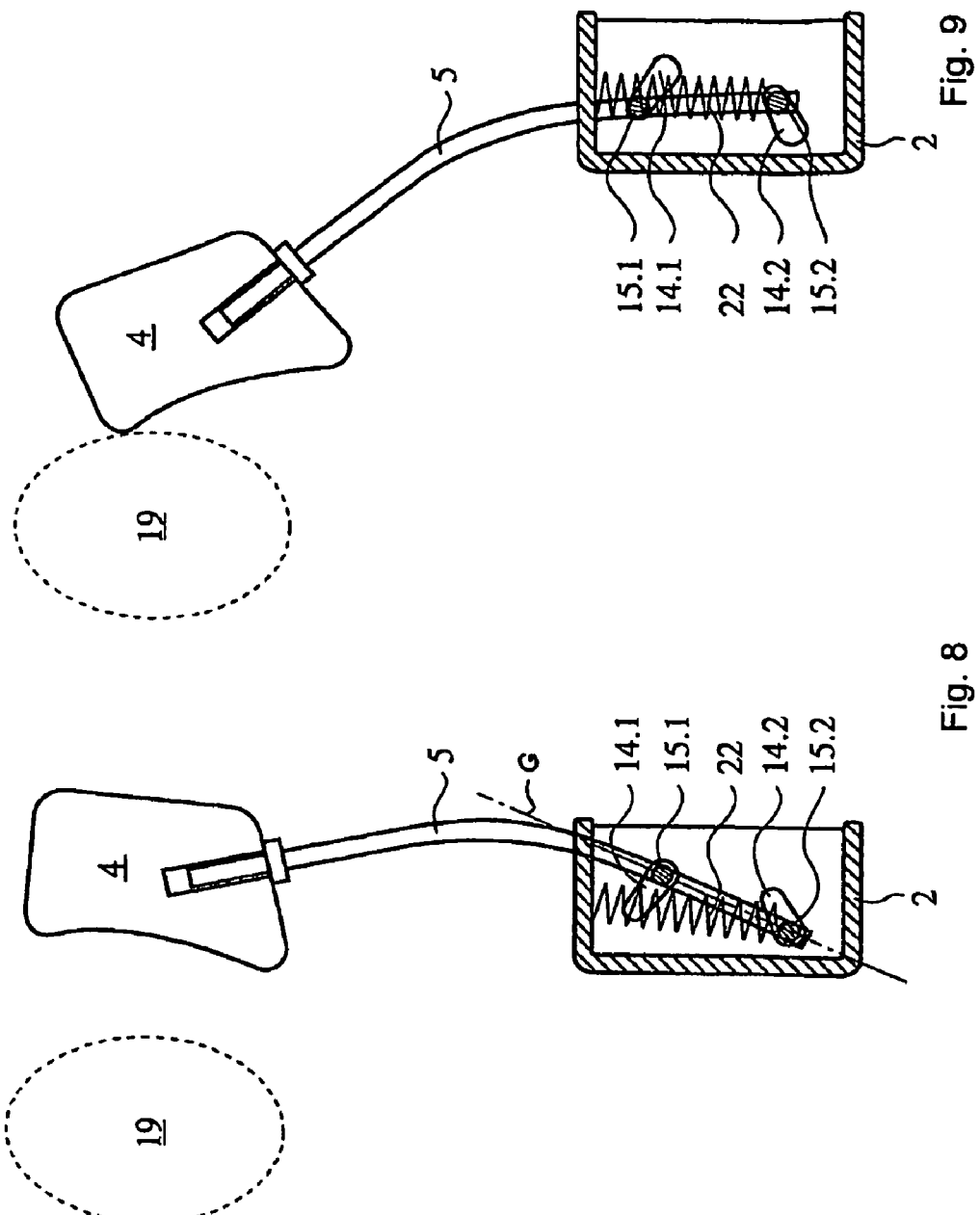

BACKREST FOR A VEHICLE SEAT

CROSS-REFERENCE TO RELATED PATENT APPLICATIONS

This application claims benefit to International Application No. PCT/EP02/09965 filed on Sep. 6, 2002, and published in the English language under PCT Article 21(2); German application no. DE 201 14 944.3, filed Sep. 10, 2001, and DE 101 50 899.9 filed Oct. 18, 2001 all of which are incorporated herein by these references.

BACKGROUND

The invention relates to a backrest for a vehicle seat, having a head restraint which can be adjusted from an in-use position into a safety position under the action of a force-generating device which is effective in an accident situation, said head restraint being connected to the backrest via retaining elements protruding into the backrest.

Even in the case of a relatively minor rear-end impact, vehicle occupants are exposed to the risk of suffering an overextension of the cervical vertebra under the effect of accident-induced acceleration forces. Although head restraints which are connected rigidly to the backrest of the vehicle seat are able to reduce the risk of injury, they are situated, for reasons concerned with comfort, too far away from the head in the in-use position in order to prevent injuries in the neck region effectively. The same is also true if the head restraint has been set to the correct height, corresponding to the vehicle occupant's height, by displacement of its guide rods in the guide sleeves of the backrest.

In order to improve the protection of the occupant, safety devices have therefore been developed which have a head restraint which can be pivoted automatically from the in-use position into a safety position in the event of a rear-end impact, as a result of which its distance from the occupant's head is reduced. Systems of this type are referred to as a "passive head restraint" if the adjustments into the safety position are brought about by the acceleration forces of the occupant acting on the seat. By contrast, if the generator of the adjusting force is fed from a separate power source, the safety system is provided with an "active" head restraint.

The laid-open specification DE 197 38 201 A1 discloses a backrest of the generic type for a vehicle seat. The passive head restraint has guide rods which protrude into the backrest and are guided in a longitudinally displaceable and fixable manner in two spaced-apart sleeves for the purpose of adjusting the height. The lower sleeve is connected directly to the frame structure of the backrest via a rotary joint while the upper sleeve is articulated on the frame structure via a toggle-lever mechanism which is angled in the in-use position. In the event of an accident, the toggle lever is stretched, as a result of which the guide rods rotate about the axis of the lower rotary joint and pivot the head restraint in the direction of the vehicle occupant's head. A leaf spring which is arranged in the lumbar region of the backrest and is curved in the in-use position is used to generate force, the leaf spring being straightened in an accident under the action of the acceleration of the occupant, as a result of which the distance between its ends is increased. This lengthening is transmitted via a mechanism to the toggle lever and changes its position in the previously described manner.

This variant basically has the disadvantage that, depending on the sitting position of the occupant, the leaf spring is insufficiently lengthened. Furthermore, the height of the head restraint, which is frequently set in quite a low position for reasons concerned with comfort, cannot be changed when adopting the safety position.

A backrest having an active head restraint is disclosed in the laid-open specification DE 199 38 904 A1. The backrest is constructed in two parts, the lower part being connected to the seat part of the vehicle seat in a conventional manner, the upper part, in contrast, being pivotable together with the head restraint relative to the lower part about an axis running transversely with respect to the longitudinal axis of the vehicle from an in-use position into a safety position. The torque required for this is generated by a compression spring which acts on a lever, is tensioned in the in-use position of the seat and locked by means of a latching device. The acceleration forces which are produced in a rear-end impact are detected by a vehicle crash sensor. A control device releases the latching device by triggering a pyrotechnic activator as soon as acceleration values which exceed a predetermined threshold value are measured.

This device satisfies the requirements placed on it in respect of the safety of the vehicle occupants, but is associated with being relatively complex in terms of design.

SUMMARY

The invention is based on the object of providing a backrest with a safety device which is effective and is simply constructed in terms of design and by means of which both the distance between the head restraint and the occupant's head and the height of the head restraint relative to the in-use position can be influenced in the safety position.

According to the invention, the object is achieved in the case of a backrest of the generic type by the retaining elements being displaceable relative to the backrest under the action of the (passive or active) force-generating device by means of at least one slotted-guide mechanism comprising a slotted guide and a sliding block guided in the latter.

In contrast with the rotation of the head restraint about a fixed axis, which rotation is known from the prior art, the slotted-guide mechanism permits the retaining elements to be guided as desired, with the result that their upwardly directed displacement can be combined with any desired pivoting movement.

According to one preferred variant of the invention, the slotted-guide mechanism can have a slotted guide with a convex recess and sliding blocks supported in the recess at at least two locations which are spaced apart from each other. When the sliding blocks are displaced, a pivoting movement is inevitably generated and this can be associated with a simultaneous height adjustment of the head restraint.

According to a further advantageous variant of the invention, the retaining elements can be displaced in each case through the frame structure by means of a leadthrough and a slotted-guide mechanism, which is spaced apart from it, in the backrest, the recess of the slotted guide running obliquely, at least in some regions, relative to a straight line connecting the sliding block to the leadthrough. The oblique profile of the recess in the slotted guide causes the sliding block to change its horizontal position at the same time as an upwardly directed displacement, so that the retaining elements overall execute a pivoting movement, the axis of rotation of which runs horizontally through the leadthroughs in a fixed position with respect to the frame structure. This design requires a particularly small amount of space if the leadthrough is arranged above the slotted-guide mechanism and the recess of the slotted guide runs rotated to the rear relative to the straight line. The sliding block is therefore also shifted to the rear during the upwardly directed displacement, which causes the head restraint to pivot forward.

As an alternative, it is conceivable to arrange the retaining elements displaceably in each case via two slotted-guide mechanisms in the backrest, which mechanisms are spaced apart from each other or merge into each other, the recesses of the slotted guides running obliquely, at least in some regions, relative to a straight line connecting the sliding blocks, and spaced apart from each other and opposed to each other.

In order to improve the function of the head restraint, it is proposed, according to a further preferred variant of the invention, for the sliding block, when displaced from the in-use position into the safety position, to be able to be locked in the recesses of the slotted guide. This can be brought about with little complexity in terms of design by the fact that the sliding block, when displaced, executes a rotational movement, as a result of which its radial extent directed toward the recess is enlarged thus enabling the sliding block to be locked in a frictional or form-fitting manner in the recess. The recess can advantageously also taper in the direction of displacement thus enabling the sliding block to be locked in a frictional or form-fitting manner in the recess.

The displacement forces caused by the force-generating device can be transferred into the head restraint in a particularly favorable manner if the retaining elements comprise at least two guide rods which are connected to each other via a strut, the force-generating device engaging, on the one hand, on the strut and, on the other hand, on the frame structure of the backrest.

In order to bring about a simple adaptation of the height of the head restraint to the vehicle occupant's height, it is alternatively proposed that the retaining element has at least two guide rods which are guided in a longitudinally displaceable and fixable manner in guide sleeves, the guide sleeves being connected to each other via a strut and the force-generating device engaging, on the one hand, on the strut and, on the other hand, on the frame structure of the backrest. For height adjustment by means of the occupant, the guide rods are displaced together with the padded part in the guide sleeves and are fixed relative to them in the desired position. By contrast, when the safety position is adopted, the guide sleeves are shifted together with the guide rods, as a result of which the padded part takes up the desired position.

A spatially favorable variant of the invention is possible by the fact that the slotted guides of the slotted-guide mechanism are connected in each case to the frame structure of the backrest and the sliding blocks are connected in each case to the retaining elements. This design also enables the head-restraint mass, which has to be accelerated when the safety position is adopted, to be kept low.

The adjusting force can be generated with little complexity and in principle in a reversible manner by means of a spring element, in particular a tension spring or compression spring, which can be locked under pretension by means of a locking device. The activation can take place via a pyrotechnic device which reacts particularly spontaneously, or by means of an electromagnetic activator, which has the advantage of multiple use.

By contrast, a particularly high acceleration can be obtained by the force-generating device comprising a compressed-gas store or, in particular, a pyrotechnic igniting charge.

DESCRIPTION OF DRAWINGS

The figures illustrate one variant of the invention by way of example and

In the figures:

FIG. 8 shows a longitudinal section through a further variant of the invention, in the in-use position FIG. 9 shows the backrest according to FIG. 8 in the safety position

DETAILED DESCRIPTION OF EXEMPLARY EMBODIMENTS

Figure 1:
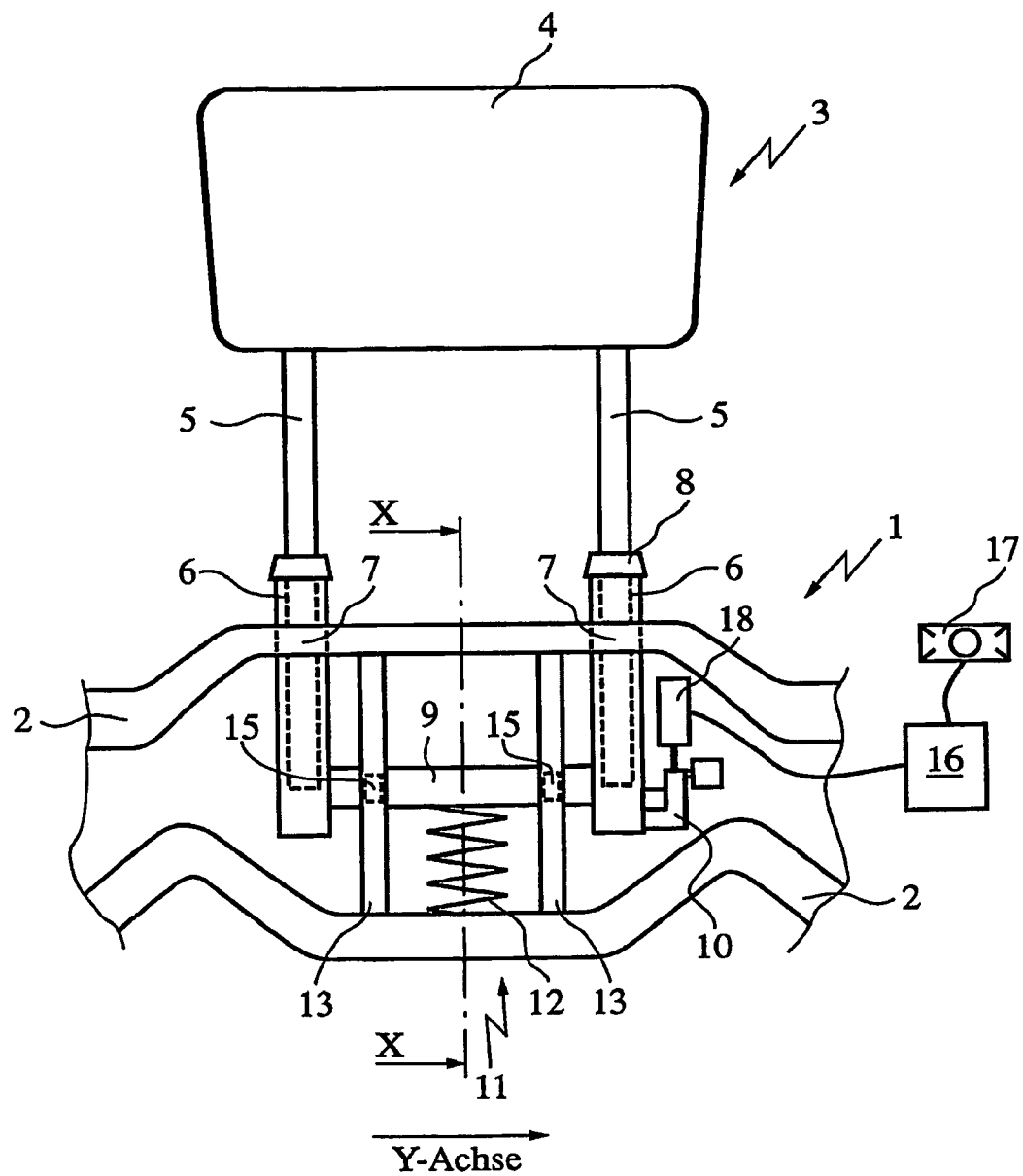
FIG. 1 shows a rear view of a backrest designed in accordance with the invention, in the in-use position
Figure 3:
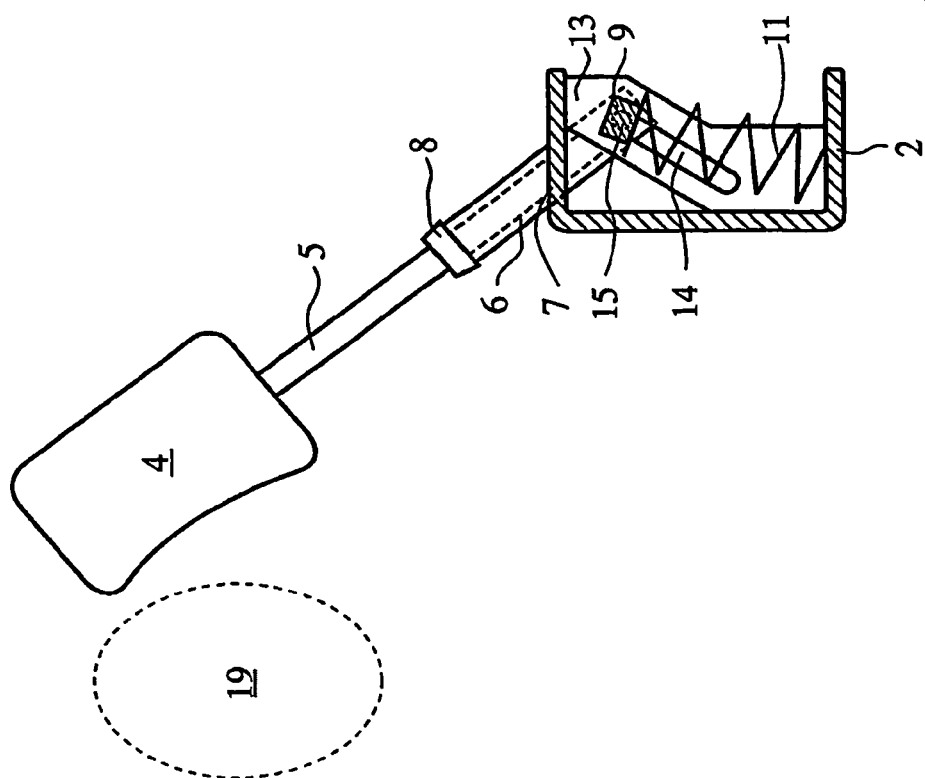
FIG. 3 shows a corresponding longitudinal section through the backrest after the safety position has been reached
Figure 2:
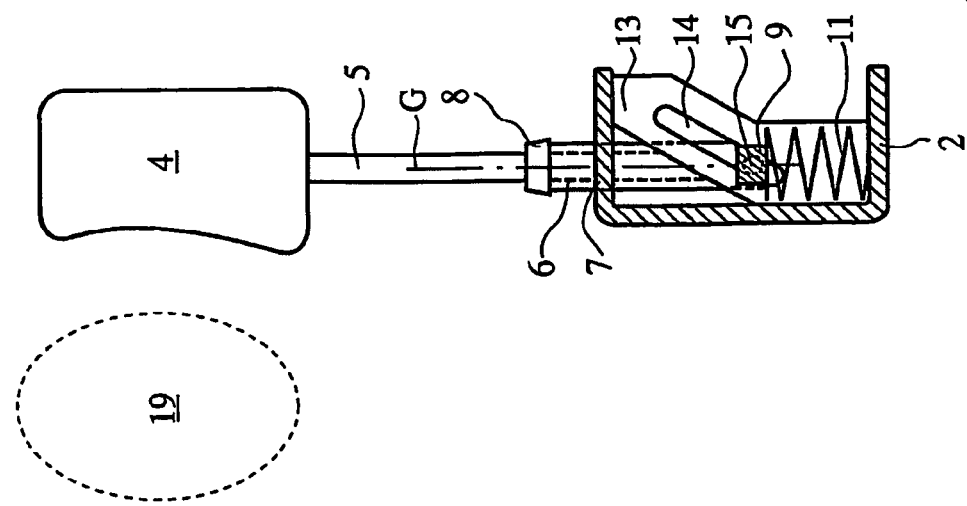
FIG. 2 shows the backrest according to FIG. 1 in the longitudinal section X—X

The backrest 1 which is depicted in part in FIG. 1 comprises a metal frame structure 2 which is provided in use with padding materials and upholstery fabrics (not illustrated). In the exemplary embodiment, the cross-section of the frame structure 2 is of U-shaped design, as is apparent from FIGS. 2 and 3.

In its upper region, the backrest 1 is provided with a head restraint 3 which comprises a padded part 4 and two vertically downwardly extending guide rods 5. The guide rods 5 are guided in a longitudinally displaceable manner in guide sleeves 6 which, for their part, are arranged in leadthroughs, designed as recesses 7, through the frame structure 2. In order to set the height of the padded part 4 relative to the frame structure 2, a catch 8 is released, so that the guide rods 5 can subsequently be displaced upward or downward in the guide sleeves 6. The position of the two components relative to each other is then fixed again by the catch 8.

The guide sleeves 6 are connected to each other by a horizontally arranged strut 9. They are arranged in a manner such that they can be displaced upward in the recesses 7, which are situated in the upper limb of the frame structure 2, and in a manner such that they can be rotated about a horizontal axis which runs transversely with respect to the longitudinal axis of the vehicle and is customarily referred to as the Y-axis of the vehicle. In the in-use position, the guide sleeves 6 are retained in the height position illustrated by means of a locking device 10.

For the basic construction of a locking device of this type reference is made to the prior art cited at the beginning.

The locking device 10 keeps a force-generating device 11 in the form of a compression spring 12 under tension, the force-generating device being supported, on the one hand, on the lower limb of the laterally open U-profile of the frame structure 2 and, on the other hand, engaging on the strut 9.

Two slotted guides 14 which are incorporated in sheet-metal plates 13 are embedded in the frame structure 2 and circular sliding blocks 15 arranged in the strut 9 engage in them. By means of this engagement and the mounting of the guide sleeves 6 in the recesses 7, the head restraint 3 is basically mounted securely in the frame structure 2 in the in-use position.

The slotted guides 14 are inclined relative to the vertical in such a manner that the sliding blocks 15 guided in them and therefore also the strut 9 are shifted to the rear at the same time as a displacement upward. For this reason, the slotted guide 14 runs at a corresponding slope relative to an imaginary straight line G connecting the sliding blocks 15 to the associated recesses 7 in the in-use position.

In the event of a rear-end impact, an electronic control device 16 ignites a pyrotechnic activator 18 as a function of the acceleration values measured by a crash sensor 17, said activator, for its part, releasing the locking device 10. Under the action of the expanding compression spring 12, the strut 9 and the guide sleeves 6 connected to it are displaced upward. The simultaneously occurring, rearwardly directed shifting of the strut 9 furthermore causes the guide sleeves 6 to undergo a rotational movement by means of which those parts of the guide rods 5 which protrude out of the frame structure 2 are pivoted toward the head 19 of the vehicle occupant. The distance between the padded part 4 and the head 19 is therefore reduced as desired in the safety position.

Figure 4:
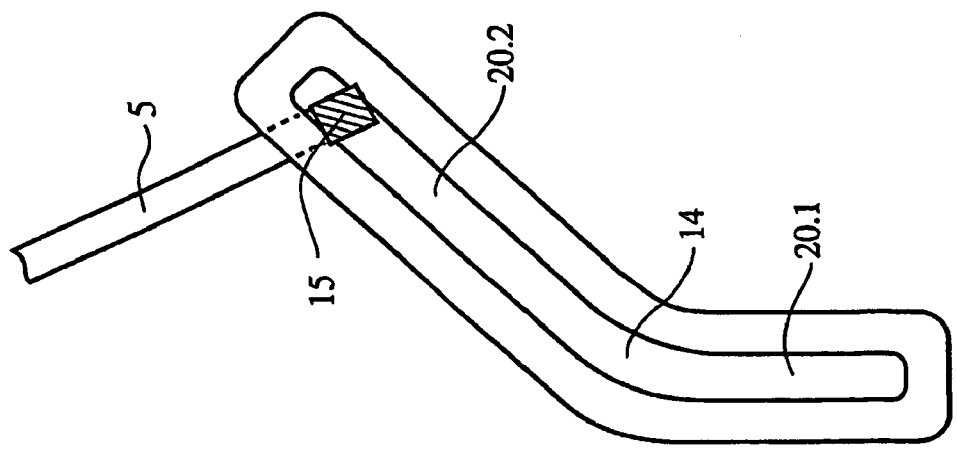
FIG. 4 shows one design of the slotted guide and sliding block according to claim 7, in the in-use position
Figure 5:
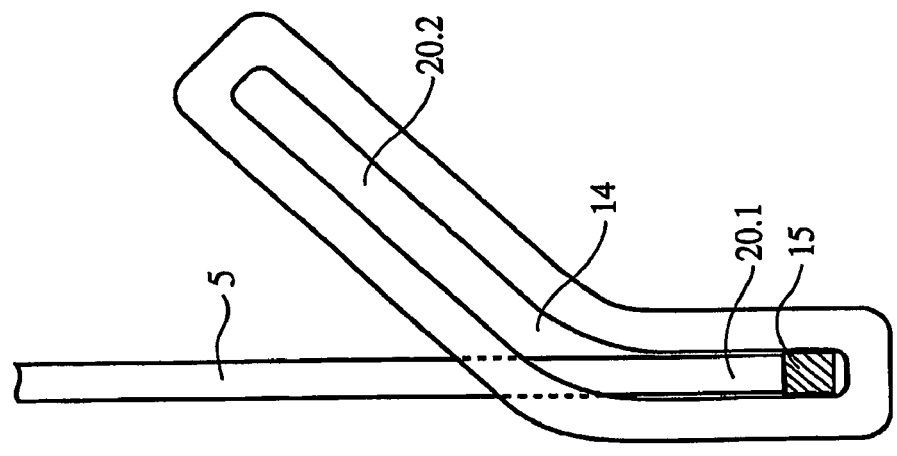
FIG. 5 shows the variant according to FIG. 4 in the safety position

FIGS. 4 and 5 show one possible design of the slotted guide 14 and sliding block 15 with which a self-locking of the guide can be brought about when the safety position has been reached. The slotted guide 14 comprises a first section 20.1 which runs essentially vertically and is upwardly adjoined by an oblique, second section 20.2 which is rotated to the rear relative to the first section 20.1. In the exemplary embodiment, the width of the slotted guide 14 remains constant.

The rectangular sliding block 15 is arranged displaceably in the slotted guide 14 and, in the in-use position, is situated in the first section 20.1 with side surfaces aligned parallel to the slotted guide 14, but, in the safety position, is displaced into the second section 20.2. During this displacement the sliding block 15 additionally undergoes a rotational movement. In a departure from the variant illustrated in FIGS. 2 and 3, the rectangular sliding block 15 increases its width in the slotted guide 14 during this rotation, as a result of which it is locked in said slotted guide. This effect can be designed in such a manner that the sliding block 15 is only slightly clamped in the slotted guide 14 and can be displaced again into the position according to FIG. 4. However, depending on the forces of displacement and the geometrical design of the guide, a form-fitting locking can also be brought about, in which the sliding block 15 uses its edges to deform the slotted guide 14 in the manner of a catch when the safety position has been reached.

Figure 6:
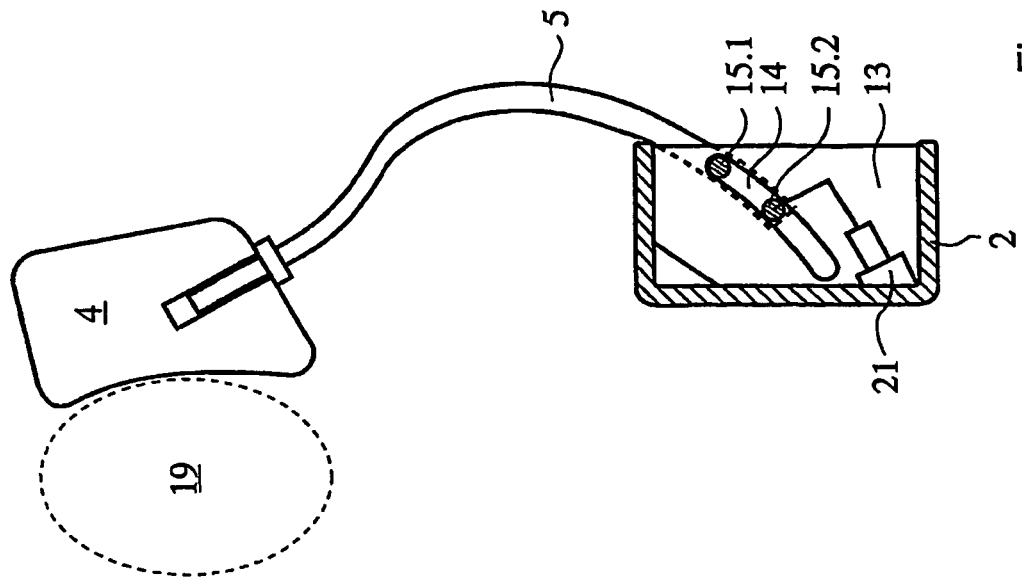
FIG. 6 shows a longitudinal section through another backrest according to the invention, in the in-use position
Figure 7:
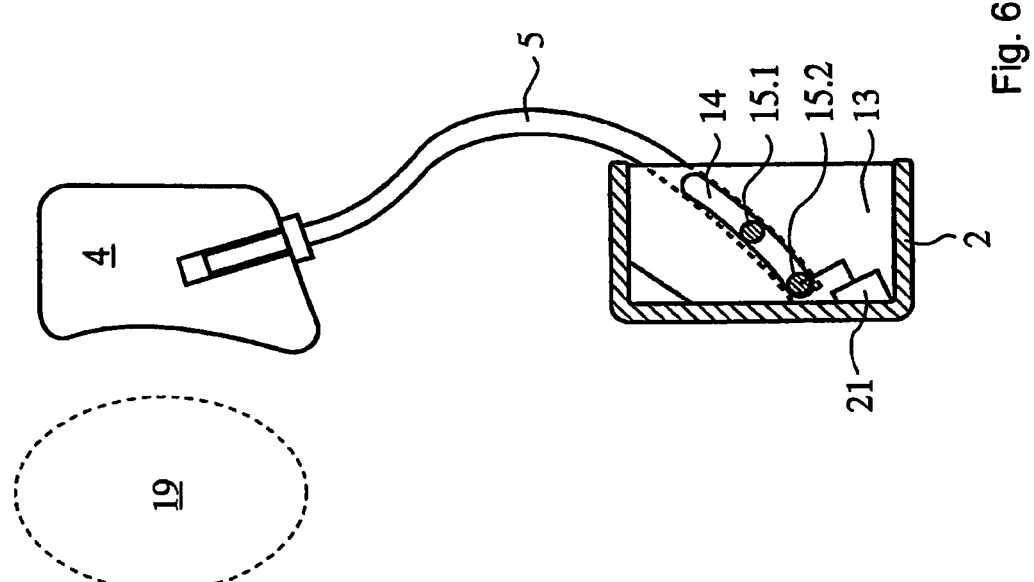
FIG. 7 shows the backrest according to FIG. 6 in the safety position

In the case of the backrest according to FIGS. 6 and 7, the guide rods 5, to which the padded part 4 of the head restraint 3 is fastened, are directly guided in convexly curved slotted guides 14 via in each case two sliding blocks 15.1 and 15.2 which are spaced apart from each other. Under the action of a force-generating device 11 in the form of one of a pyrotechnic activator, an electromagnetic activator, a compressed gas store and a pyrotechnic igniting charge 21 the sliding blocks 15 are displaced in the arcuate slotted guide 14, as a result of which both a shifting of the height and also a rotational movement of the padded part 4 are brought about. In the case of this head restraint 3, the adaptation to the occupant's height can be undertaken by displacing the padded part 4 relative to the guide rods 5.

FIGS. 8 and 9 show a last design of the invention. The guide rods 5 of the head restraint 3 depicted there are held by sliding blocks 15.1 and 15.2 which are guided in each case in separate slotted guides 14.1 and 14.2. The recesses of the slotted guides 14.1 and 14.2 run obliquely, at least in some regions, relative to an imaginary straight line G connecting the sliding blocks 15.1 and 15.2 in the in-use position, and offset with respect to each other and directed counter to each other. By means of the lower slotted guide 14.2, the lower end of the guide rod 5 is deflected to the rear during the displacement into the safety position; in contrast, the upper end of the guide rod 5 is deflected forward by the mirror-inverted position of the upper slotted guide 14.1. During a displacement upward, which is initiated by a force-generating device 11 in the form of a tension spring 22, the head restraint 3 performs a pivoting movement toward the head 19 of the occupant. The slotted guides 14 furthermore narrow in the direction of displacement from the in-use position into the safety position, so that the sliding blocks 15, when displaced, become wedged in the slotted guide 14 and lock the head restraint 3 in the safety position.

The invention claimed is:

1. A backrest (1) including a frame structure (2) and a force-generating device (11) for a vehicle seat, having a head restraint (3) which can be adjusted from an in-use position into a safety position under action of the force-generating device (11) which is effective in an accident situation, said head restraint being connected to the backrest via retaining elements protruding into the backrest, the retaining elements being displaceable relative to the backrest (1) under the action of the force-generating device (11) by a pair of slotted-guide mechanisms, each of the slotted-guide mechanisms comprising: a slotted guide: (14) and a sliding block (15) guided in the latter, wherein the sliding block (15), when displaced from the in-use position into the safety position, executes a rotational movement enabling the sliding block to be locked in one of a frictional and form-fitting manner in the slotted guide (14), wherein the retaining elements have at least two guide rods (5) which are guided in a longitudinally displaceable and fixable manner in guide sleeves (6), the guide sleeves being connected to each other via a strut (9) and the force-generating device (11) engaging, on one end, on the strut and, at another end, on the frame structure (2) of the backrest (1).

2. The backrest as claimed in claim 1, wherein the sliding block is configured in a rectangle cross-section.

3. The backrest as claimed in claim 1 wherein the slotted guide (14) can be deformed by the edges of the sliding block (15) in a manner of a catch when the safety position is reached.

4. The backrest as claimed in claim 1 wherein the slotted guide (14) has, in the direction of displacement, a first section (20.1) which runs essentially vertically and is adjoined at the top by a second section (20.2) which runs obliquely relative to the first section (20.1).

5. The backrest as claimed in claim 4, wherein the second section (20.2) is aligned to the rear relative to the first section (20.1).

6. The backrest as claimed in claim 1 wherein the slotted guide (14) tapers in the direction of displacement.

7. The backrest as claimed in claim 1 wherein the slotted-guide mechanism has a convex slotted guide (14) and the sliding block (15) supported in the slotted guide in at least two locations spaced apart from each other.

8. The backrest as claimed in claim 1 wherein the retaining elements can be displaced through the frame structure by a leadthrough and the slotted-guide mechanism, which is spaced apart from the leadthrough, in the backrest (1), the slotted guide (14) selectively running obliquely, relative to a straight line (G) connecting the sliding block (15) to the leadthrough in the in-use position.

9. The backrest as claimed in claim 8, wherein the leadthrough is configured above the slotted-guide mechanism and the slotted guide (14) runs aligned to the rear relative to the straight line (G).

10. The backrest as claimed in claim 1 wherein the retaining elements can be displaced via said two slotted-guide mechanisms in the backrest each having said sliding block, with said slotted guides running obliquely, at least in some regions, relative to a straight line (G) connecting the two sliding blocks in the in-use position, and spaced apart from each other and directed counter to each other.

11. The backrest as claimed in claim 1 wherein the force-generating device (11) comprises a compressed-gas store.

12. The backrest as claimed in claim 1 wherein the force-generating device (11) comprises a pyrotechnic igniting charge (21).

13. The backrest as claimed in claim 1 wherein the slotted guides (14) of each of the slotted-guide mechanisms are connected to the frame structure (2) of the backrest (1) and the sliding blocks (15) are connected to the retaining elements.

14. The backrest as claimed in claim 1 wherein the force-generating device (11) comprises a spring element, which can be locked under pretension by means of a locking device (10).

15. The backrest as claimed in claim 14, wherein the locking device (10) can be released by a pyrotechnic activator (18).

16. The backrest as claimed in claim 14, wherein the locking device (10) can be released by an electromagnetic activator.

17. The backrest as claimed in claim 14, wherein the spring element is one of a tension spring (12) and a compression spring (22).

18. A backrest (1) including a frame structure (2) and a force-generating device (11) for a vehicle seat, having a head restraint (3) which can be adjusted from an in-use position into a safety position under action of the force-generating device (11) which is effective in an accident situation, said head restraint being connected to the backrest via retaining elements protruding into the backrest, the retaining elements being displaceable relative to the backrest (1) under the action of the force-generating device (11) by a slotted-guide mechanism, the slotted-guide mechanism comprising: a slotted guide: (14) and a sliding block (15) guided in the latter, wherein the sliding block (15), when displaced from the in-use position into the safety position, executes a rotational movement enabling the sliding block to be locked in one of a frictional and form-fitting manner in the slotted guide (14), wherein the retaining elements comprise at least two guide rods (5) which are connected to each other via a strut (9), the force-generating device (11) engaging, at one end, on the strut and, at another end, on the frame structure (2) of the backrest (1).

19. The backrest as claimed in claim 18 wherein the force-generating device (11) comprises a spring element, which can be locked under pretension by means of a locking device (10).

20. The backrest as claimed in claim 19, wherein the spring element is one of a tension spring (12) and a compression spring (22).

21. The backrest as claimed in claim 19, wherein the locking device (10) can be released by a pyrotechnic activator (18).

22. The backrest as claimed in claim 19, wherein the locking device (10) can be released by an electromagnetic activator.

* * * * *